Sept. 19, 1933.    C. D. HAWKINS    1,927,234
EMASCULATING IMPLEMENT
Filed Feb. 18, 1933    3 Sheets-Sheet 1
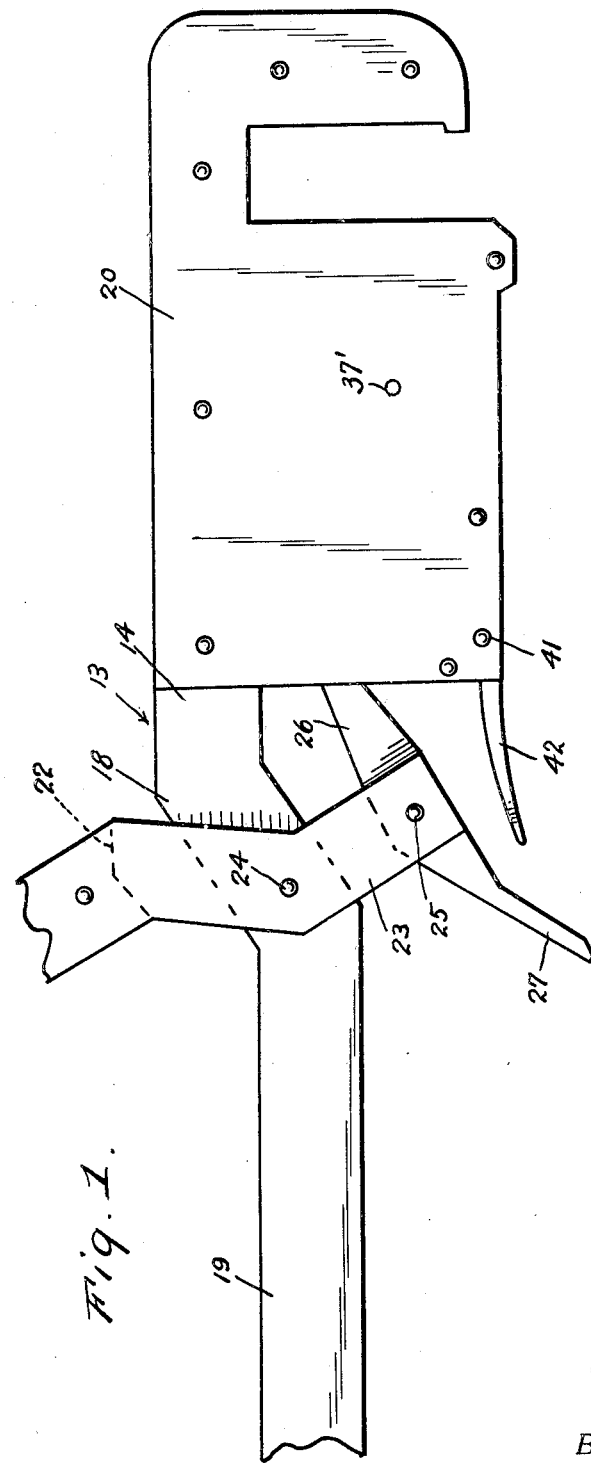
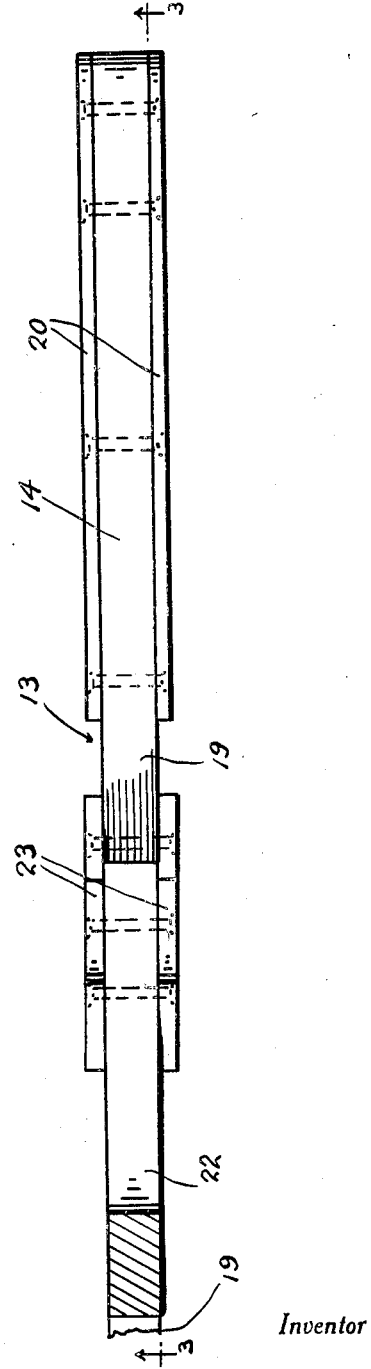
Inventor
Clyde D. Hawkins
By *Clarence A. O'Brien*
Attorney

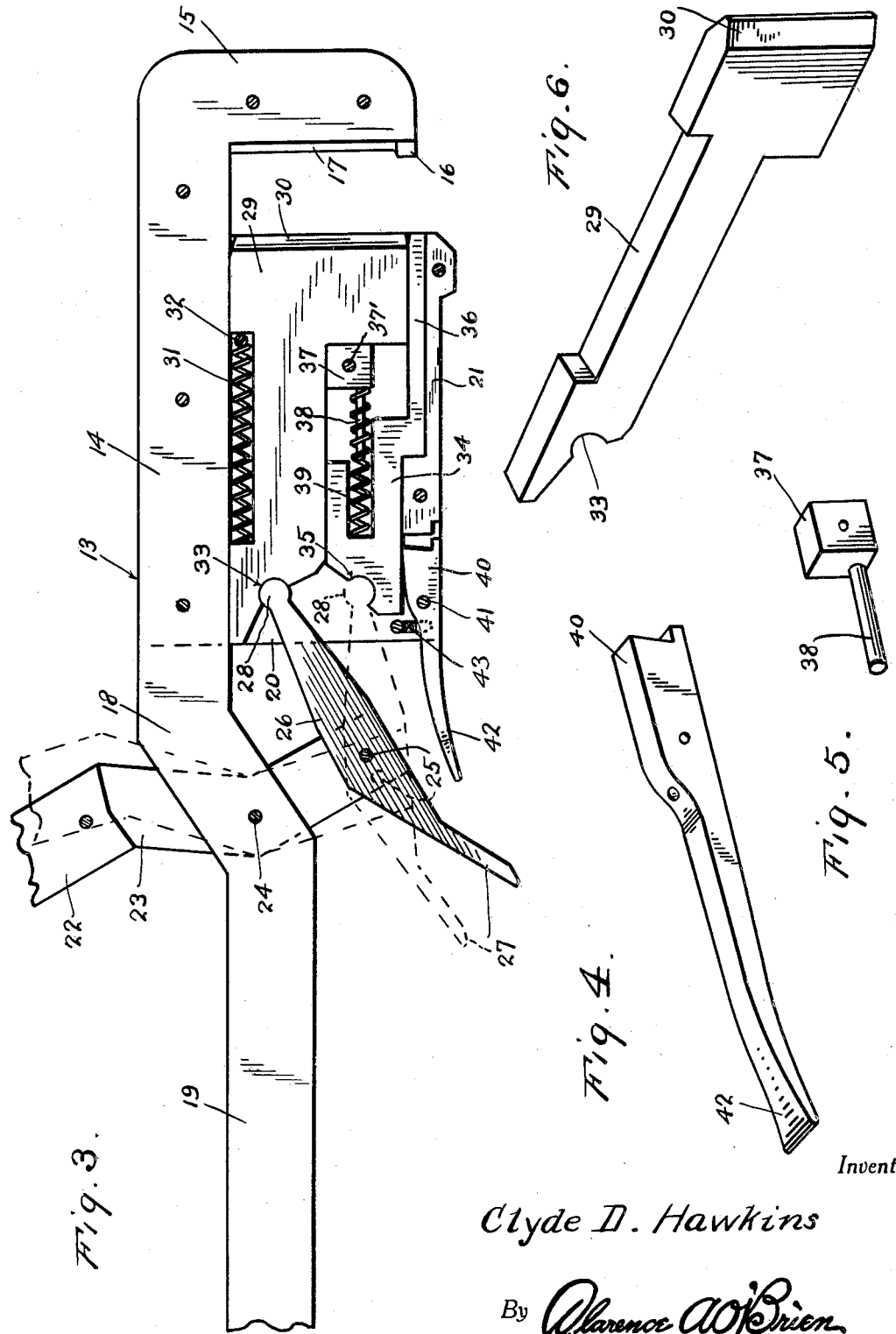

Sept. 19, 1933. C. D. HAWKINS 1,927,234
EMASCULATING IMPLEMENT
Filed Feb. 18, 1933  3 Sheets-Sheet 3
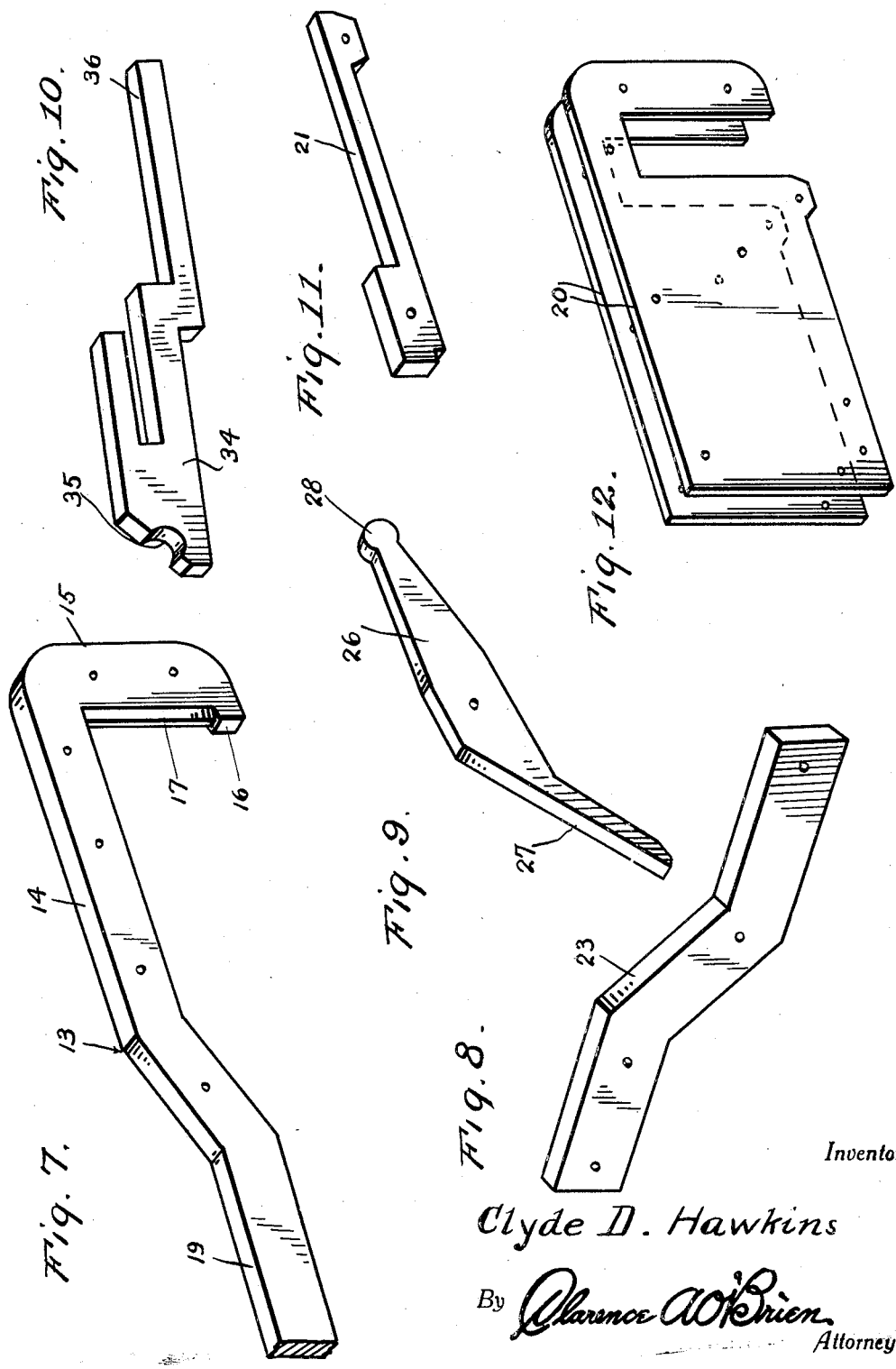
Inventor
Clyde D. Hawkins
By Clarence A. O'Brien
Attorney Patented Sept. 19, 1933

1,927,234

UNITED STATES PATENT OFFICE 1,927,234

EMASCULATING IMPLEMENT

Clyde D. Hawkins, Carrollton, Mo.

Application February 18, 1933. Serial No. 657,435

5 Claims. (Cl. 128—306)

This invention relates to an improved veterinarian implement primarily used for emasculating purposes and especially designed for castrating animals such as cattle, horses, and sheep.

By way of introduction I would state that I am aware of the fact that castrating implements used for the same purpose are not broadly new in the art or the trade to which the invention appertains. Therefore, it is my primary aim to generally improve upon those devices which are known to me at this time by providing a structure which is remarkably different in design and construction, the arrangement being such as to promote efficiency and expediency in use, whereby to permit the operation to be accomplished in a humane and satisfactory manner.

The particular mechanical details selected for carrying the inventive conception into actual practice will become more readily apparent from the following description and drawings.

In the accompanying illustrative drawings, wherein like numerals are employed to designate like parts throughout the same:

Figure 1 is an elevational view of an implement constructed in accordance with the principles of the present inventive conception.

Figure 2 is a top plan view of the structural arrangement depicted in Figure 1.

Figure 3 is a longitudinal view primarily in elevation, the section being taken approximately on the plane of the line 3—3 of Figure 2.

Figures 4 to 12 inclusive are perspective details of the component parts used in the construction of the preferred embodiment of the invention.

Referring now to the drawings by distinguishing reference numerals wherein like numerals are employed to designate like parts throughout the views, it will be observed that the frame proper denoted by the numeral 13 comprises a metal bar 14 of appropriate dimensions having one end portion directed laterally as indicated at 15 to form a fixed jaw, this jaw being equipped with an abutment 16 and an appropriate crushing edge 17.

The intermediate portion of the frame is directed laterally as indicated at 18 and then formed into an elongated end portion which defines a handle 19. The numerals 20 designate a pair of duplicate spaced parallel cover plates secured to the bar 14 and having a complemental spacer element 21 located between the opposite longitudinal edges thereof as shown in Figure 3. The element 21 also functions as a guide.

The operating lever is denoted by the numeral 22 and provided with a pair of suitably shaped actuating links 23 attached to the portion 18 as indicated at 24. Pivotally mounted between the free end portions of the links as indicated at 25 is a part which may be distinguished as a pitman 26, one end of this being fashioned with a finger-piece 27 and the opposite end with a jointing and pressure applying head or terminal 28.

I next call attention to the numeral 29 in Figure 3, which designates the relatively movable jaw or plunger. This is formed at its right hand end with a companion crushing edge or blade 30 opposed to the crushing edge 17. This jaw 29 is appropriately shaped to accommodate a return spring 31 bearing against a fixed maintenance pin 32. The numeral 33 designates a seat suitably shaped for optional and alternate reception of the co-operative pitman head 28.

The numeral 34 designates a second plunger-like device which is shaped to fit between the jaw 29 and the guide element 21. It is also fashioned with a seat 35 for reception of the head 28 as shown in dotted lines and further fashioned to provide a projectible finger or pin 36 for holding the spermatic cord of the testicles in place for subsequent severing.

The block-like member 37 which is fastened between the plates 20 by a pin 37' carries a spring holding pin 38 to accommodate the coiled return spring 39 for the cord holding plunger 34.

The numeral 40 designates a suitably shaped latch pivoted between the plates as indicated at 41 and co-operable with the plunger 34 to hold it in a set position in an obvious manner. The latch is formed with a suitable fingergrip 42 and held in retaining position through the instrumentality of an expansion spring 43 co-operable therewith as shown in Figure 3.

From the foregoing it will be observed that the frame 14 is provided with a stationary handle 19 toward and from which the actuating lever 22 is movable. The frame is equipped with the stationary jaw 15 and its complemental severing blade 17. It carries the cover plates 20 which are spaced apart and provide a casing for the selectively and alternately slidable plunger-like devices 34 and 29 respectively. It also houses the latch 40 and return springs 31 and 39.

The lever 22 is important in that it carries the properly shaped links 23 which in turn suspend the pivotally hung pitman 26. This arrangement permits the pitman to be swung to the dotted line position for initial use and the full line position for the second step in the operation. This leads me to say that in using the device the head 28 of the pitman is first placed in the seat 35 as shown in dotted lines and the lever 22 is actuated to force the spermatic cord retention finger 36 to a position to hold the cord between said finger and the abutment 16. The spring-pressed latch 40 holds the finger in this position. Then the lever 22 is swung back to a position to permit the pitman to be shifted to the full line position shown in Figure 3 at which time an operating connection is provided between the lever and the plunger-like slidable jaw 29.

Thus, by moving the lever 22 toward the handle 19 the blades 17 and 30 are brought together with sufficient pressure to crush the testicle cords in a well-known manner.

Broadly, I have provided a suitable frame provided with a casing containing the mechanism forming the successively projectible parts 36 and 29 for holding the cords and severing the cords, wherein said frame serves to accommodate the actuating lever 22 and the interchangeable pitman 26. Manifestly the springs 31 and 39 function to automatically return the parts 29 and 36 to their normal positions when the lever 22 is swung to its normal open position. Moreover, it is evident that the spring-pressed latch 40 holds the finger 36 in place until the operation is completed, whereupon the latch is tripped to release said finger 36.

The block-like member 37 carries the pin 38 to retain the spring 39 properly in place and the member 37 also performs as a guide for the sliding jaw 29.

It is thought from the foregoing description that the advantages and novel features of the invention will be readily apparent.

It is to be understood that changes may be made in the construction and in the combination and arrangement of the several parts provided that such changes fall within the scope of the appended claims.

I claim:

1. A castrating implement of the class described comprising a frame embodying a stationary handle and a jaw, said jaw being formed with a fixed severing blade and an adjacent cord maintenance abutment, a casing secured to said frame, a slidable spring returned jaw mounted in said casing and provided with a severing blade opposed to said first-named blade, a spring returned cord retention finger slidable in said casing and projectible to a position for co-operation with said abutment, a lever pivotally attached to said handle, a retaining latch for said finger carried by said casing, and an operating connection between the lever, said finger, and said slidable jaw.

2. A castrating implement of the class described comprising a frame embodying a stationary handle and a jaw, said jaw being formed with a fixed severing blade and an adjacent cord maintenance abutment, a casing secured to said frame, a slidable spring returned jaw mounted in said casing and provided with a severing blade opposed to said first-named blade, a spring returned cord retention finger slidable in said casing and projectible to a position for co-operation with said abutment, a lever pivotally attached to said handle, a retaining latch for said finger carried by said casing, and an operaitng connection between the lever, said finger, and said slidable jaw, said operating connection including a pivotally suspended manually released pitman detachably and alternately co-operable with the finger and jaw for successively operating said parts in the order named.

3. A castrating implement of the class described comprising a frame embodying an elongated bar formed at one end into a handle and at its opposite end into a right angularly directed extension constituting a stationary jaw and provided with a severing edge and an associated abutment, a casing comprising a pair of plates secured to said bar in spaced parallelism, a plunger-like device slidable between said plates and constituting a movable jaw and provided with a blade opposed to said first-named blade, a return spring for said jaw, said jaw being formed at its inner end with a notch providing a seat, a cord retention finger slidably mounted between said plates and movable toward and from said abutment and provided at its inner end with a notch forming a second seat, a spring-pressed latch between said plates and co-operable with said finger, a return spring for said finger mounted between said plates, an operating lever pivotally attached to said handle, a pitman secured to said lever and provided at one end with a finger grip and at its inner end with a head selectively placeable in said seat.

4. A castrating implement of the class described comprising a frame in the form of an elongated bar fashioned at one end to provide a handle and at its opposite end to form a right-angularly disposed stationary jaw, said jaw being formed with a severing blade and a cord retention abutment, a casing attached to said frame and comprising a pair of spaced parallel plates, a plunger-like device slidable between said plates and functioning as a slidable jaw and formed with a severing blade opposed to said first-named blade, said device being formed at its inner end with a notch providing a fulcrum seat, a return spring confined between the plates and co-operable with said device to return it to a normal open position, a lever, a pair of links attached to said lever and pivotally connected with the handle adjacent the inner ends of said plates, a pitman pivotally mounted intermediate its ends on the free end portions of said links, said pitman being formed at its outer end with a head removably fulcrumed in said seat, the opposite end of said pitman being formed to provide a finger grip.

5. A castrating implement of the class described comprising a frame in the form of an elongated bar fashioned at one end to provide a handle and at its opposite end to form a right-angularly disposed stationary jaw, said jaw being formed with a severing blade and a cord retention abutment, a casing attached to said frame and comprising a pair of spaced parallel plates, a plunger-like device slidable between said plates and functioning as a slidable jaw and formed with a severing blade opposed to said first-named blade, said device being formed at its inner end with a notch providing a fulcrum seat, a return spring confined between the plates and co-operable with said device to return it to a normal open position, a lever, a pair of links attached to said lever and pivotally connected with the handle adjacent the inner ends of said plates, a pitman pivotally mounted intermediate its ends on the free end portions of said links, said pitman being formed at its outer end with a head removably fulcrumed in said seat, the opposite end of said pitman being formed to provide a finger grip, a second plunger-like device slidable between said plates and provided with an extension finger projectible toward and from said abutment, said second-named device being formed at its inner end with a notch defining a fulcrum seat for alternate reception of the fulcrum head on said pitman, return spring means mounted between the plates and engageble with said second-named device to return it to its normal ineffective position, a manually released latch pivotally mounted between said plates and engageable at one end with said second-named device to hold it in a projected position, and spring-means for maintaining said latch against the second-named device.

CLYDE D. HAWKINS.